(12) United States Patent
Hilton

(10) Patent No.: US 12,232,672 B2
(45) Date of Patent: Feb. 25, 2025

(54) SPOT CLEANING IMPLEMENT

(71) Applicant: Gionni Asante Hilton, Columbus, OH (US)

(72) Inventor: Gionni Asante Hilton, Columbus, OH (US)

(*) Notice: Subject to any disclaimer, the term of this patent is extended or adjusted under 35 U.S.C. 154(b) by 161 days.

(21) Appl. No.: 17/699,106

(22) Filed: Mar. 19, 2022

(65) Prior Publication Data

US 2022/0313052 A1 Oct. 6, 2022

Related U.S. Application Data

(60) Provisional application No. 63/168,211, filed on Mar. 30, 2021.

(51) Int. Cl.

| | |
|---|---|
| *A47L 13/16* | (2006.01) |
| *A47L 13/17* | (2006.01) |
| *A47L 13/42* | (2006.01) |
| *A47L 13/44* | (2006.01) |
| *B60S 3/00* | (2006.01) |

(52) U.S. Cl.
CPC .............. *A47L 13/16* (2013.01); *A47L 13/17* (2013.01); *A47L 13/42* (2013.01); *A47L 13/44* (2013.01); *B60S 3/00* (2013.01)

(58) Field of Classification Search
CPC .......... A47L 13/10; A47L 13/16; A47L 13/17; A47L 13/256; A47L 13/42; A47L 13/44; B60S 3/00

See application file for complete search history.

(56) References Cited

U.S. PATENT DOCUMENTS

| | | | | |
|---|---|---|---|---|
| 2,334,796 | A | | 2/1941 | Steinmetz et al. |
| 2,756,449 | A | * | 7/1956 | Dewey ..................... B60S 3/047 |
| | | | | 15/235 |
| 5,177,831 | A | * | 1/1993 | Wirth ....................... A47L 13/20 |
| | | | | 15/235 |
| 8,499,406 | B2 | * | 8/2013 | Fava ........................ A46B 17/00 |
| | | | | 15/228 |
| 8,938,844 | B1 | * | 1/2015 | James ...................... B60S 3/002 |
| | | | | 15/228 |
| D759,925 | S | * | 6/2016 | Martens .......................... D32/50 |
| 2003/0019065 | A1 | * | 1/2003 | Smith ....................... A47L 13/20 |
| | | | | 15/228 |
| 2005/0136238 | A1 | | 6/2005 | Lindsay et al. |

(Continued)

*Primary Examiner* — Randall E Chin
(74) *Attorney, Agent, or Firm* — QuickPatents; Kevin Prince

(57) ABSTRACT

A cleaning implement for spot cleaning a surface includes a cleaning block having a plurality of sides and edges, and is preferably a cube. One or more elongated cleaning strips each have an outside surface, an inside surface, a first end, and an opposing second end. A fastening mechanism is adapted for fixing the first end to the second end, around the cleaning block. Each cleaning strip includes, on at least the outside surface thereof but preferably also on the inside surface thereof, a wear indicator positioned for each side of the cleaning block over which the cleaning strip is attached. Spot cleaning the surface using a side with one of the wear indicators causes the wear indicator to change visually. As such, with each cleaning strip fastened around the cleaning block, the cleaning block may be grasped and used to spot clean the surface.

15 Claims, 4 Drawing Sheets

(56) References Cited

U.S. PATENT DOCUMENTS

| | | |
|---|---|---|
| 2005/0160550 A1* | 7/2005 | Reeves ............... A46B 17/08 |
| | | 15/247 |
| 2005/0273958 A1* | 12/2005 | Dillon ................. A47L 13/16 |
| | | 15/104.93 |
| 2006/0200933 A1* | 9/2006 | McDonnell ......... A47L 13/44 |
| | | 15/247 |
| 2007/0174998 A1 | 8/2007 | Powell |
| 2009/0110890 A1 | 4/2009 | Garza et al. |
| 2009/0236485 A1 | 9/2009 | Goepfert et al. |
| 2009/0255073 A1* | 10/2009 | Emmons ............. A47L 25/005 |
| | | 15/104.002 |
| 2011/0282212 A1 | 11/2011 | Hyoun et al. |

* cited by examiner

SPOT CLEANING IMPLEMENT

CROSS-REFERENCE TO RELATED APPLICATIONS

This application claims the benefit of U.S. Provisional Patent Application 63/168,211, filed on Mar. 30, 2021, and is incorporated herein by reference.

STATEMENT REGARDING FEDERALLY SPONSORED RESEARCH AND DEVELOPMENT

Not Applicable.

FIELD OF THE INVENTION

This invention relates to cleaning implements, and more particularly to an improved spot cleaning implement.

BACKGROUND

Various industries, such as vehicle manufacturing and painting, require cleaning implements at hand for small spills and stains caused by overpainting, or grease or oil spills on a finished surface. Typically bulky packs of moistened wipes are used, but this is inefficient since an entire wipe is rarely needed for small spills.

Therefore, there is a need for a device that provides for effective and efficient spot cleaning of a surface, such as a vehicle surface. Such a needed invention would be relatively inexpensive and intuitive to use, and would provide a means for identifying if a cleaning side surface of the cleaning implement has previously been used. The present invention accomplishes these objectives.

SUMMARY OF THE INVENTION

The present device is a cleaning implement for spot cleaning a surface, such as an automobile fender or other object. The cleaning implement includes a cleaning block that has a plurality of sides and edges. Preferably the cleaning block is a cube having twelve rounded edges, six flat sides, and eight rounded corners.

One or more elongated cleaning strips each have an outside surface, an inside surface, a first end, and an opposing second end. Each elongated cleaning strip is preferably made with a non-woven polyester or bamboo fiber material, and is optionally infused with a cleaning solution. Such elongated cleaning strips may be packaged together in a water-tight container until ready for use, at which time one or two elongated cleaning strips are removed from the container and wrapped around the cleaning block.

For each elongated cleaning strip, a fastening mechanism is adapted for fixing the first end of the cleaning strip to the second end of the cleaning strip, around at least two of the edges and two of the faces of the cleaning block. Such a fastening mechanism may include a two-part mechanical fastener, such as a hook-and-loop type material, wherein a first part of the two-part mechanical fastener is fixed proximate the first end of the elongated cleaning strip, and wherein a second part of the two-part mechanical fastener is fixed proximate the send end of the elongated cleaning strip.

Preferably each cleaning strip includes, on at least the outside surface thereof but preferably also on the inside surface thereof, a wear indicator positioned over each side of the cleaning block over which the cleaning strip is attached. Spot cleaning the surface using a side with one of the wear indicators causes the wear indicator to change visually, such as turn from a first color such as blue, to a second, contrasting color, such as white. As such, which sides of the cleaning block have been used is visually apparent. Once all of the wear indicators have been worn to the second color, the cleaning strip may be removed from the cleaning block, flipped over, and re-applied to the cleaning block, wherein the inside surface of the cleaning strip now faces away from the cleaning block and is ready for use.

As such, with each cleaning strip fastened around the cleaning block, the first end of each cleaning strip fastened to the opposing second end of the cleaning strip, the cleaning block may be grasped and used to spot clean the surface.

In some embodiments wherein the cleaning block is the cube, each cleaning strip may take the shape of a cross, such that when folded around the cleaning block all six sides of the cleaning block are covered by a single cleaning strip. In embodiments wherein the cleaning strip is linear, two such cleaning strips must be used to cover each side of the cube, and that leaves two sides of the cube with a double layer of the cleaning strips. Thus the cross-shaped cleaning strip is more efficient at covering the cube. Flaps of such a cleaning strip may be included for affixing the cleaning strip to the cleaning block, such as with adhesive, the hook-and-loop type material, or the like.

The present invention is a device that provides for effective and efficient spot cleaning of a surface, such as a vehicle surface. Such a invention would be relatively inexpensive and intuitive to use, and would provide a means for identifying if a cleaning side surface of the cleaning implement has previously been used. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
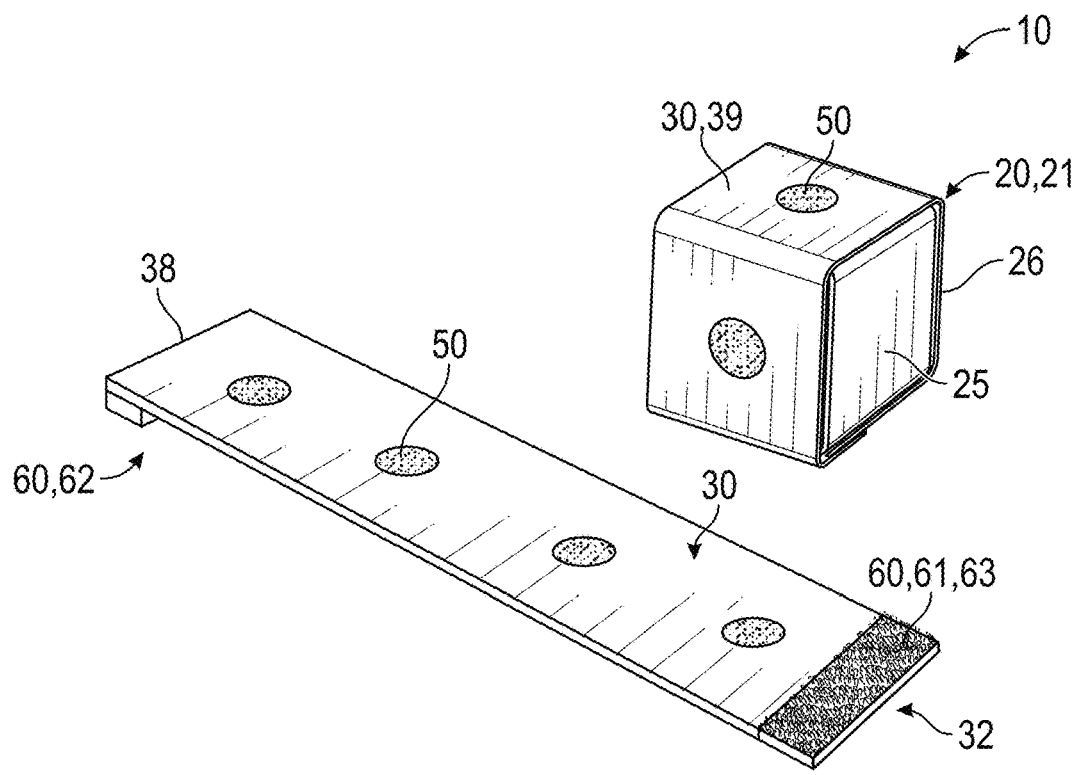
FIG. 1 is a perspective view of a cleaning implement having a cleaning block with an elongated cleaning strip wrapped therearound, and also showing a second elongated cleaning strip in a flat configuration before wrapping around the cleaning block.
Figure 2:
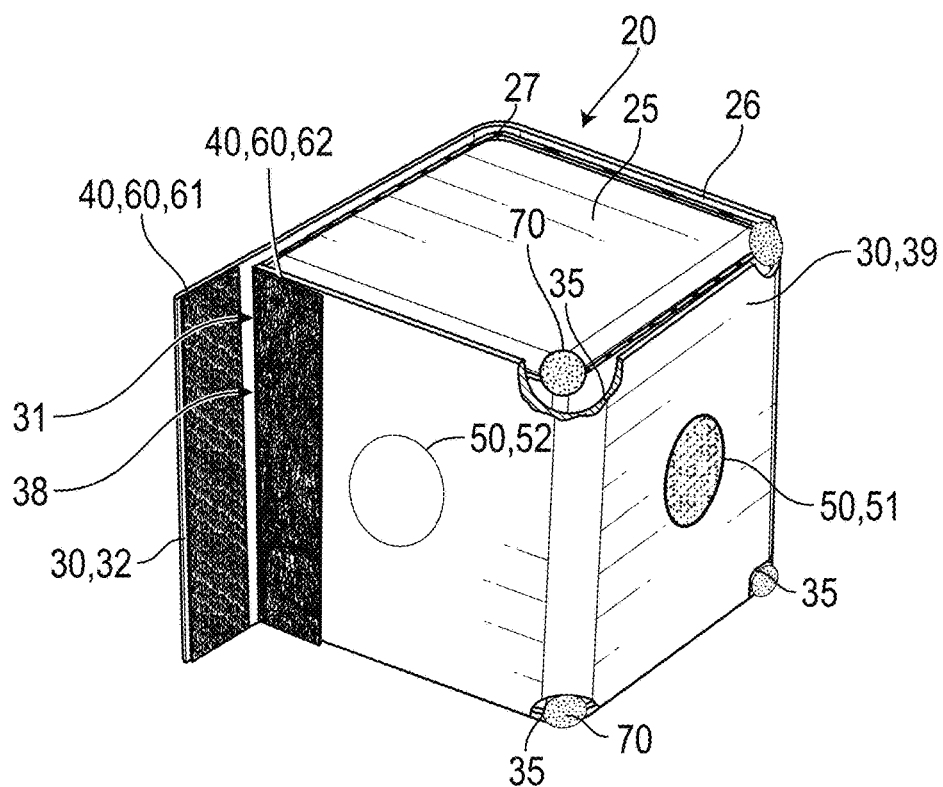
FIG. 2 is an enlarged perspective view of an alternate embodiment of the cleaning block having finger grips at corners thereof, several of the finger grips omitted for clarity of illustration.
Figure 3:
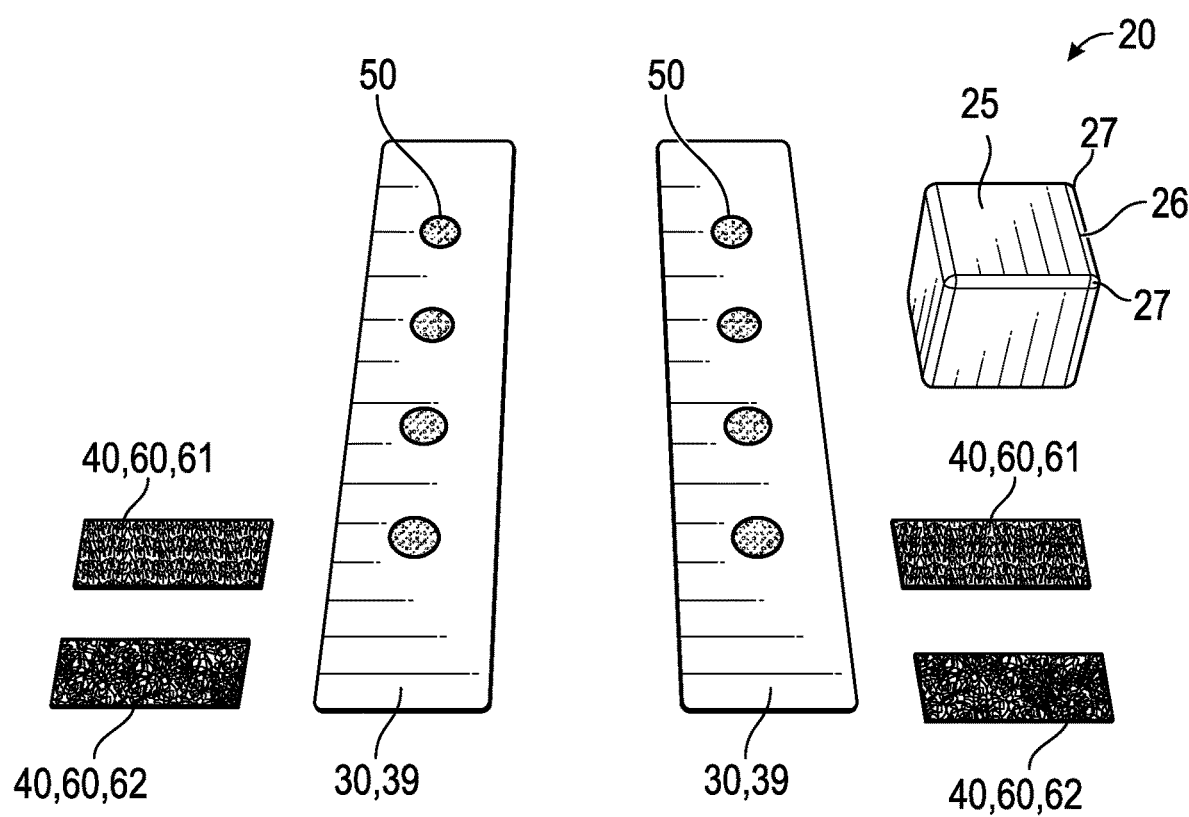
FIG. 3 is a perspective exploded view of the invention.
Figure 4:
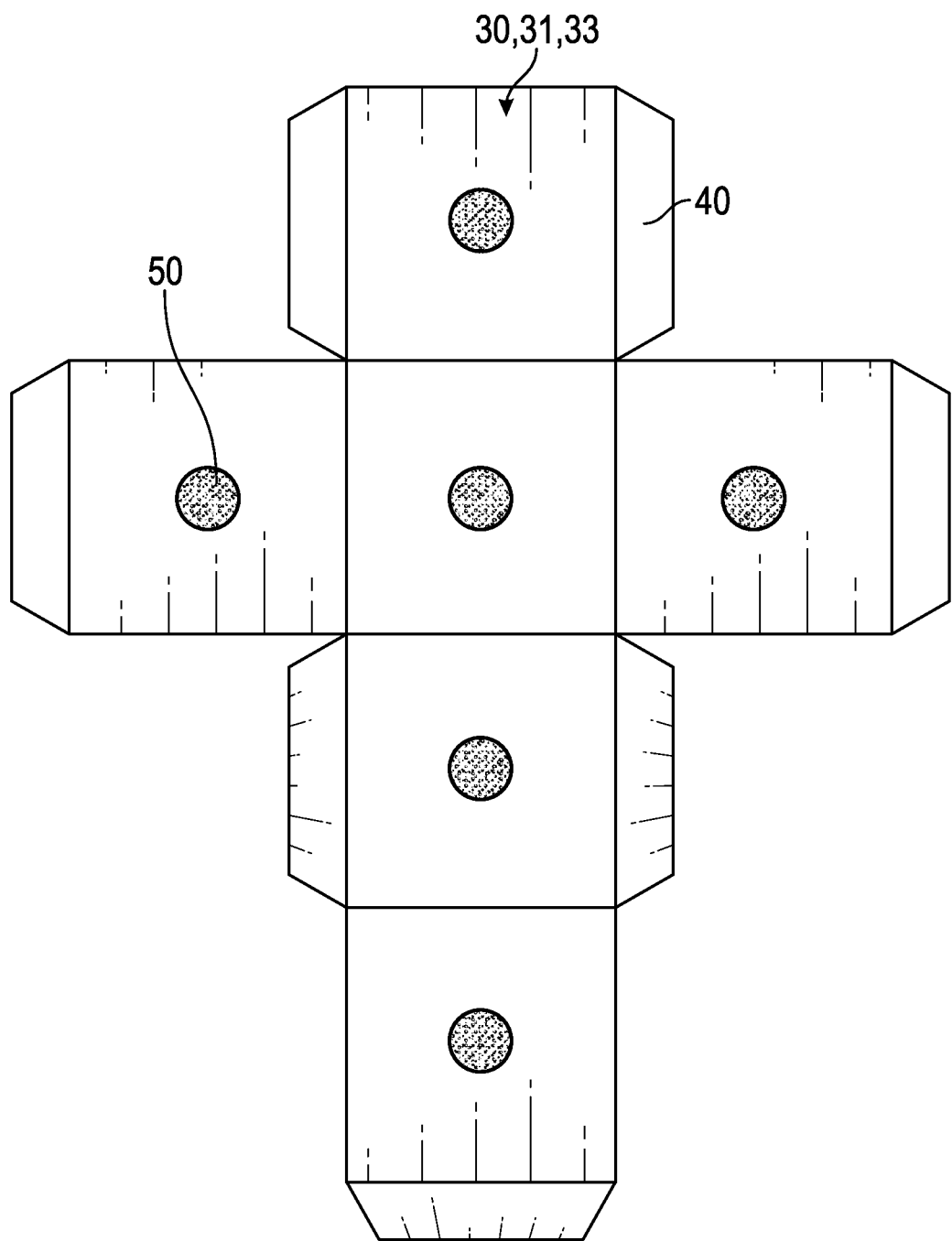
FIG. 4 is an alternate cross-shaped embodiment of the elongated cleaning strip in a flat configuration.

FIGS. 1-3 illustrate a cleaning implement 10 for spot cleaning a surface, such as an automobile fender or other object.

The cleaning implement 10 includes a cleaning block 20 that has a plurality of sides 25 and edges 26. Preferably the cleaning block 20 is a cube 21 having twelve rounded edges 26, six flat sides 25, and eight corners 27. Preferably the cleaning block 20 is made from a rigid or semi-rigid plastic material. In other embodiments, the cleaning block 20 is made from a resilient foam material, polyester, polypropylene, air-laid paper, non-woven spun-lace fabric, plastic textiles, wood, or any type of metal.

One or more elongated cleaning strips 30 each have an outside surface 39, an inside surface 31, a first end 32, and an opposing second end 38. Each elongated cleaning strip 30 is preferably made with a non-woven polyester or bamboo fiber material, and is optionally infused with a cleaning solution. Such elongated cleaning strips 30 may be packaged together in a water-tight container (not shown) until ready for use, at which time one or two elongated cleaning strips 30 are removed from the container and wrapped around the cleaning block 20.

For each elongated cleaning strip 30, a fastening mechanism 40 is adapted for fixing the first end 32 of the cleaning strip 30 to the second end 38 of the cleaning strip 30, around at least two of the edges 26 and two of the faces 25 of the cleaning block 20. Such a fastening mechanism 40 may include a two-part mechanical fastener 60, such as a hook-and-loop type material 63, wherein a first part 61 of the two-part mechanical fastener 60 is fixed proximate the first end 32 of the elongated cleaning strip 30, and wherein a second part 62 of the two-part mechanical fastener 60 is fixed proximate the second end 38 of the elongated cleaning strip 30.

Such a two-part mechanical fastening mechanism 60 may optionally include a tongue-in-groove mechanism (not shown) cooperative with the cleaning block 20. Alternately, such a two-part mechanical fastening mechanism 60 may include mechanical snaps, or adhesive (not shown) fixed on both ends 32, 38 of the elongated cleaning strip 30. In such an embodiment the adhesive may be covered until ready for use by an adhesive liner, as is known in the art. Alternately, the ends 32, 38 of the elongated cleaning strip 30 may include the first part 61 of the hook-and-loop type material 63, while the cleaning block 25 includes the second part 62 of the hook-and-loop type material 63. Alternately, the material of the elongated cleaning strip 30 may naturally include loops that can be fixed with a hook-type material (not shown) fixed about the cleaning block 20.

Preferably each cleaning strip 30 includes, on at least the outside surface 39 thereof but preferably also on the inside surface 31, a wear indicator 50 positioned over each side 25 of the cleaning block 20 over which the cleaning strip 30 is attached. Spot cleaning the surface using a side 25 with one of the wear indicators 50 causes the wear indicator 50 to change visually, such as turning from a first color 51 such as blue, to a second, contrasting color 52, such as white. As such, which sides 25 of the cleaning block 20 have been used is visually apparent. Once all of the wear indicators 50 have been worn to the second color 52, the cleaning strip 30 may be removed from the cleaning block 20, flipped over, and re-applied to the cleaning block 20, wherein the inside surface 31 of the cleaning strip 30 now faces away from the cleaning block 20 and is ready for use.

As such, with each cleaning strip 30 fastened around the cleaning block 20, the first end 32 of each cleaning strip 30 fastened to the opposing second end 38 of the cleaning strip 30, the cleaning block 20 may be grasped and used to spot clean the surface.

In some embodiments wherein the cleaning block 20 is the cube 21, each cleaning strip 30 may take the shape of a cross 33 (FIG. 5), such that when folded around the cleaning block 20 all six sides 25 of the cleaning block 20 are covered by a single cleaning strip 30. In embodiments wherein the cleaning strip 30 is linear (FIGS. 1-3), two such cleaning strips 30 must be used to cover each side 25 of the cube 21, and that leaves two sides 25 of the cube 21 with a double layer of the cleaning strips 30. Thus the cross-shaped cleaning strip 30 is more efficient at covering the cube 21. Flaps 36 of such a cleaning strip 30 may be included for affixing the cleaning strip 30 to the cleaning block 20, such as with adhesive, the hook-and-loop type material 63, or the like.

The packing container holding the elongated cleaning strips 30 may be configured for receiving used such cleaning strips 30 for convenient disposal or recycling. Such a container may also include a sub-compartment (not shown) for holding the cleaning block 20. In some embodiments the cleaning strips 30 are wound on a spool like tape.

Figure 5:
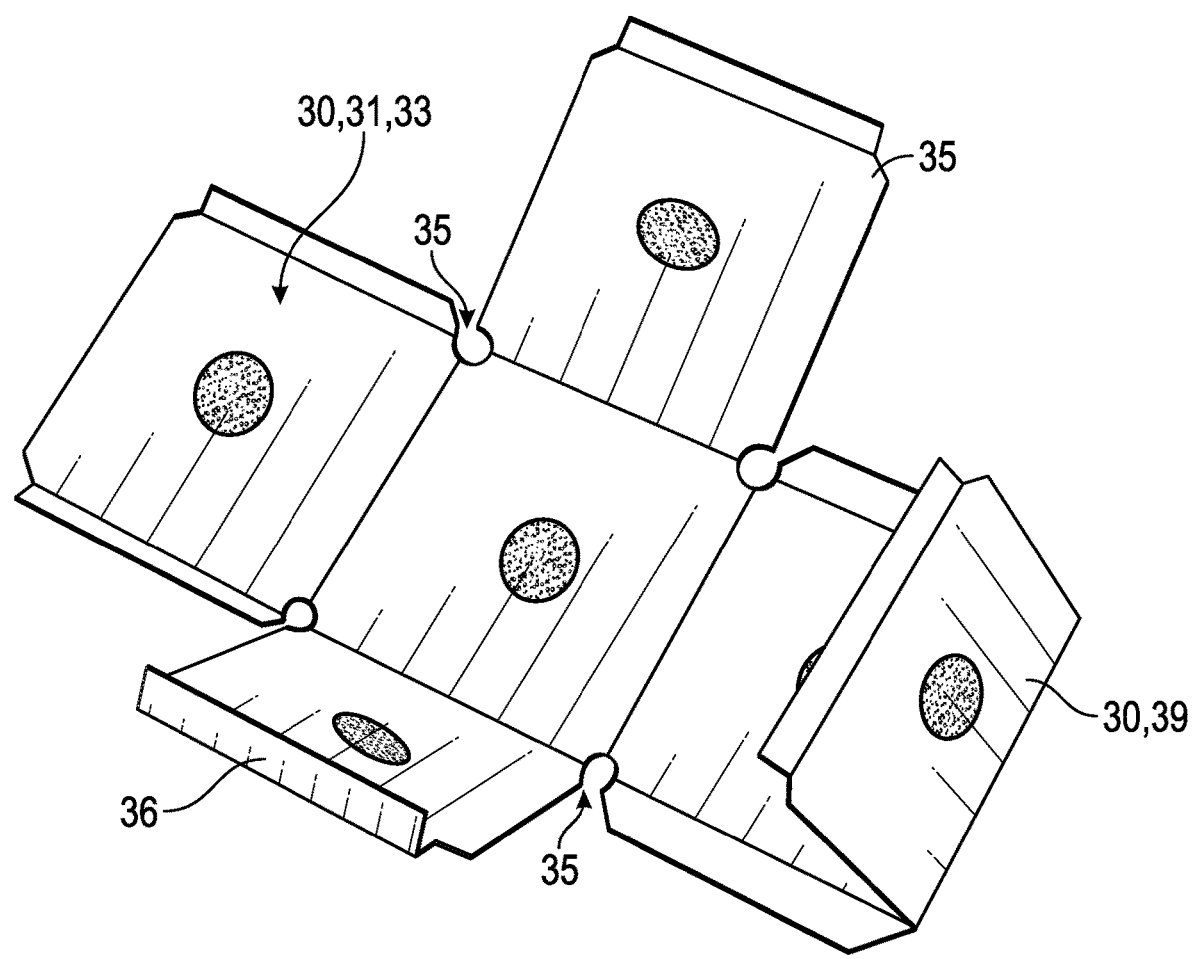
FIG. 5 is a perspective view of the cross-shaped cleaning strip in a partially folded configuration.

In some embodiments, as shown in FIGS. 2 and 5, the cleaning implement 10 includes rubber finger grips 70 positioned in corners 27 of the cleaning block 20. The cleaning strip 30 includes notches 35 that are configured to receive each finger grip 70 when the cleaning strip 30 is wrapped around the cleaning block 20. This configuration allows the finger grips 70 to remain exposed for improved grip while the cleaning strip 30 is securely fastened around the cleaning block 20.

While a particular form of the invention has been illustrated and described, it will be apparent that various modifications can be made without departing from the spirit and scope of the invention. For example, the shape of the cleaning block 20 might be a substantially flat geometric shape, such as a square, rectangle, triangle, pentagon, or the like, having just a thin edge. Such a cleaning block 20 can be stamped from a plastic sheet material, or laser cut from a rigid material such as wood or metal. Alternately, the cleaning block 20 might be a different geometrical solid, such as a rectangular prism, a pyramid, a cylinder, a tetrahedron, a triangular prism, dodecahedron, or other suitable shape. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A cleaning implement for spot cleaning a surface, comprising:
   a cleaning block having a plurality of sides and edges;
   one or more elongated cleaning strips each having an outside surface, an inside surface, a first end, and an opposing second end; and
   for each cleaning strip, a fastening mechanism adapted for fixing the first end of the cleaning strip to the second end of the cleaning strip, around at least two of the edges and two of the sides of the cleaning block;
   wherein each cleaning strip includes, on at least the outside surface thereof, a wear indicator positioned over each side of the cleaning block over which the cleaning strip is attached, spot cleaning the surface using a side with one of the wear indicators causing the wear indicator to change visually;
   whereby with the one or more cleaning strips fastened around the cleaning block, the first end of each cleaning strip fastened to the opposing end of the cleaning strip, the cleaning block may be grasped and used to spot clean the surface.

2. The cleaning implement of claim 1 wherein the cleaning block is a cube having twelve rounded edges and six flat sides.

3. The cleaning implement of claim 2 having one of the cleaning strips in the shape of a cross, whereby all six sides of the cleaning block are covered with the cleaning strip.

4. The cleaning implement of claim 1 wherein the wear indicator initially has a first color and, when the cleaning strip at the wear indicator has been applied to the surface for spot cleaning, the wear indicator assumes a second, contrasting color.

5. The cleaning implement of claim 4 wherein the first color is blue and the second color is clear or white.

6. The cleaning implement of claim 4 wherein the wear indicators are included on both the outside surface and the inside surface of the one or more cleaning strips, whereby once the wear indicators of the outside surfaces of the cleaning strips have been used and have changed to the second color, the cleaning strips can be removed, flipped over, and reattached to the cleaning cube so that the inside surface of the cleaning strips is now facing outwardly and can be used for spot cleaning the surface.

7. The cleaning implement of claim 1 wherein the fastening mechanism is a two part mechanical fastener, a first part fixed proximate the first end of the cleaning strip and a second part fixed proximate the second end of the cleaning strip.

8. The cleaning implement of claim 7 wherein the two-part mechanical fastener is a hook-and-loop type material.

9. A cleaning implement for spot cleaning a surface, comprising:
   a cleaning block having a plurality of sides and edges;
   one or more elongated cleaning strips each having an outside surface, an inside surface, a first end, and an opposing second end; and
   for each cleaning strip, a fastening mechanism adapted for fixing the first end of the cleaning strip to the second end of the cleaning strip, around at least two of the edges and two of the sides of the cleaning block;
   wherein the cleaning block is a cube having twelve rounded edges and six flat sides;
   wherein corners of the cleaning block further include rubber finger grips, and wherein the cleaning strip includes notches for receiving each finger grip;
   whereby with the one or more cleaning strips fastened around the cleaning block, the first end of each cleaning strip fastened to the opposing end of the cleaning strip, the cleaning block may be grasped and used to spot clean the surface.

10. A cleaning implement for spot cleaning a surface, comprising:
    a cleaning block is a cube having twelve rounded edges and six flat sides;
    one or more elongated cleaning strips each having an outside surface, an inside surface, a first end, and an opposing second end, each cleaning strip including, on at least the outside surface thereof, a wear indicator positioned over each side of the cleaning block over which the cleaning strip is attached, spot cleaning the surface using a side with one of the wear indicators causing the wear indicator to change visually;
    for each cleaning strip, a fastening mechanism adapted for fixing the first end of the cleaning strip to the second end of the cleaning strip, around at least two of the edges and two of the sides of the cleaning block, each fastening mechanism being a two part mechanical fastener, a first part fixed proximate the first end of the cleaning strip and a second part fixed proximate the second end of the cleaning strip;

corners of the cleaning block further including rubber finger grips, and wherein the cleaning strip includes notches for receiving each finger grip;

whereby with the one or more cleaning strips fastened around the cleaning block, the first end of each cleaning strip fastened to the opposing end of the cleaning strip, the cleaning block may be grasped and used to spot clean the surface.

11. The cleaning implement of claim 10 wherein the wear indicator initially has a first color and, when the cleaning strip at the wear indicator has been applied to the surface for spot cleaning, the wear indicator assumes a second, contrasting color.

12. The cleaning implement of claim 11 wherein the first color is blue and the second color is clear or white.

13. The cleaning implement of claim 10 wherein the two-part mechanical fastener is a hook-and-loop type material.

14. The cleaning implement of claim 10 having one of the cleaning strips in the shape of a cross, whereby all six sides of the cleaning block are covered with the cleaning strip.

15. The cleaning implement of claim 10 wherein the wear indicators are included on both the outside surface and the inside surface of the one or more cleaning strips, whereby once the wear indicators of the outside surfaces of the cleaning strips have been used and have changed to the second color, the cleaning strips can be removed, flipped over, and reattached to the cleaning cube so that the inside surface of the cleaning strips is now facing outwardly and can be used for spot cleaning the surface.

* * * * *